(12) United States Patent
Hart et al.

(10) Patent No.: US 7,149,888 B1
(45) Date of Patent: Dec. 12, 2006

(54) METHOD AND APPARATUS FOR BOOTING THE OPERATING ENVIRONMENT OF AN AUTONOMOUS SUBSYSTEM IN A COMPUTER BASED SYSTEM WITHOUT INVOLVEMENT OF THE MAIN OPERATING SYSTEM

(75) Inventors: Frank P. Hart, Apex, NC (US); Edward J. Pole, Hillsboro, OR (US); Kelan Silvester, Portland, OR (US); Paul Zurcher, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 481 days.

(21) Appl. No.: 09/675,977

(22) Filed: Sep. 29, 2000

(51) Int. Cl.
*G06F 9/24* (2006.01)
(52) U.S. Cl. .......................................... 713/2
(58) Field of Classification Search .............. 713/1, 713/2, 100, 300, 323, 324; 710/8, 10, 62, 710/104; 709/217, 219, 220, 221, 222
See application file for complete search history.

(56) References Cited

U.S. PATENT DOCUMENTS

| | | | |
|---|---|---|---|
| 4,747,041 A | | 5/1988 | Engel et al. |
| 5,280,627 A | * | 1/1994 | Flaherty et al. ............ 713/2 |
| 5,367,688 A | * | 11/1994 | Croll ............................ 713/2 |
| 5,408,624 A | | 4/1995 | Raasch et al. |
| 6,088,785 A | | 7/2000 | Hudson et al. |
| 6,421,777 B1 | * | 7/2002 | Pierre-Louis et al. ........ 713/2 |
| 6,430,687 B1 | * | 8/2002 | Aguilar et al. ............... 713/2 |
| 6,473,857 B1 | * | 10/2002 | Panas et al. .................. 713/2 |

FOREIGN PATENT DOCUMENTS

| | | |
|---|---|---|
| EP | 0 592 079 | 4/1994 |
| JP | 11328137 A * | 11/1999 |
| WO | WO 99/40520 | 8/1999 |
| WO | PCT/US01/30349 | 5/2003 |

OTHER PUBLICATIONS

IBM Technical Disclosure Bulletin—"Method for Automatically Selecting Correct BIOS Code to Support Network Initial Program Load from Remote Systems that Use Different Network Protocols"—Oct. 1, 1997—vol. 40, Issue 10, pp. 167-168.*

* cited by examiner

*Primary Examiner*—Thuan Du
(74) *Attorney, Agent, or Firm*—Blakely, Sokoloff, Taylor & Zafman LLP

(57) ABSTRACT

A method and apparatus for booting the operating environment of an autonomous subsystem in a computer based system without involvement of the main operating system are described.

18 Claims, 7 Drawing Sheets

METHOD AND APPARATUS FOR BOOTING THE OPERATING ENVIRONMENT OF AN AUTONOMOUS SUBSYSTEM IN A COMPUTER BASED SYSTEM WITHOUT INVOLVEMENT OF THE MAIN OPERATING SYSTEM

FIELD OF THE INVENTION

The present invention pertains to the field of computers. More particularly, the present invention relates to booting the operating environment of a subsystem without involvement of the main operating system.

BACKGROUND OF THE INVENTION

Computer based systems are becoming more mobile. This mobility often places an emphasis on usability. Usability is often extended by the ability to operate the equipment for longer periods of time. This time period is often related to the power consumption of the equipment, particularly in battery operated equipment. Thus, high power consumption may pose problems.

Numerous approaches to reducing power consumption have been tried. Powering off equipment when not in active use is one approach. Other approaches involve putting equipment in various lower power states, such as, idle mode, sleep mode, hibernation mode, etc. Such approaches may involve turning off portions of circuits or components, powering down subsystems and/or the main system, lowering supply voltages, altering clocking mechanisms, transferring data from, for example, random access memory (RAM) to disk storage, etc.

Upon exiting such lower power states the computer based system may resume or boot up the operating system. After booting up or resuming operation of the operating system an application may be executed to perform operations. Time required to boot up the operating system may present a problem for a subsystem that needs a rapid response. Power consumed during the boot up process may also present a problem for battery operated equipment.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for booting the operating environment of an autonomous subsystem in a computer based system without involvement of the main operating system are described. For purposes of discussing the invention, it is to be understood that various terms are used by those knowledgeable in the art to describe the sequence by which a system may start itself up. Such a start up is often referred to as a boot or booting process. Booting may be from, for example, an initial application of power to the device, often called a power on or cold boot. Booting may be from a system that is partially powered up already. Booting may be from a system fully powered up, often called a warm boot or reset. It is to be understood that the boot sequence involves acquiring additional instructions and/or data as the result of a stimulus, such as a power switch, a reset button, a received signal, etc. The acquisition of additional instructions and/or data may be from, for example, a hard disk, a floppy disk, a network, flash memory, etc. The result of the boot process is to place the computer based device in an operation mode where is it capable of receiving additional information and executing programs. An example would be the power up sequence of a personal computer using a Windows® operating system or the Linux® operating system.

It is to be understood that the term shutdown may, but is not limited to, controlling a device, system, or subsystem by completely shutting off power, partially shutting down power, operating on a different voltage, operating at a different frequency, etc. A device, system, subsystem, or equipment that is shutdown is intended, among other things, to reduce power consumption. There are numerous approaches to reducing power consumption. Powering off equipment when not in active use is one approach. Other approaches involve putting equipment in various lower power states, such as, idle mode, sleep mode, hibernation mode, etc. Such approaches may involve turning off portions of circuits or components, powering down subsystems and/or the main system, lowering supply voltages, altering clocking mechanisms, etc.

A machine-readable medium is understood to include any mechanism for storing information in a form readable by a machine (e.g., a computer) such as read only memory (ROM); random access memory (RAM); magnetic disk storage media; optical storage media; flash memory devices; electrical, optical, acoustical; as well as for transmitting information in a form of propagated signals such as carrier waves, infrared signals, digital signals, etc.

Figure 1:
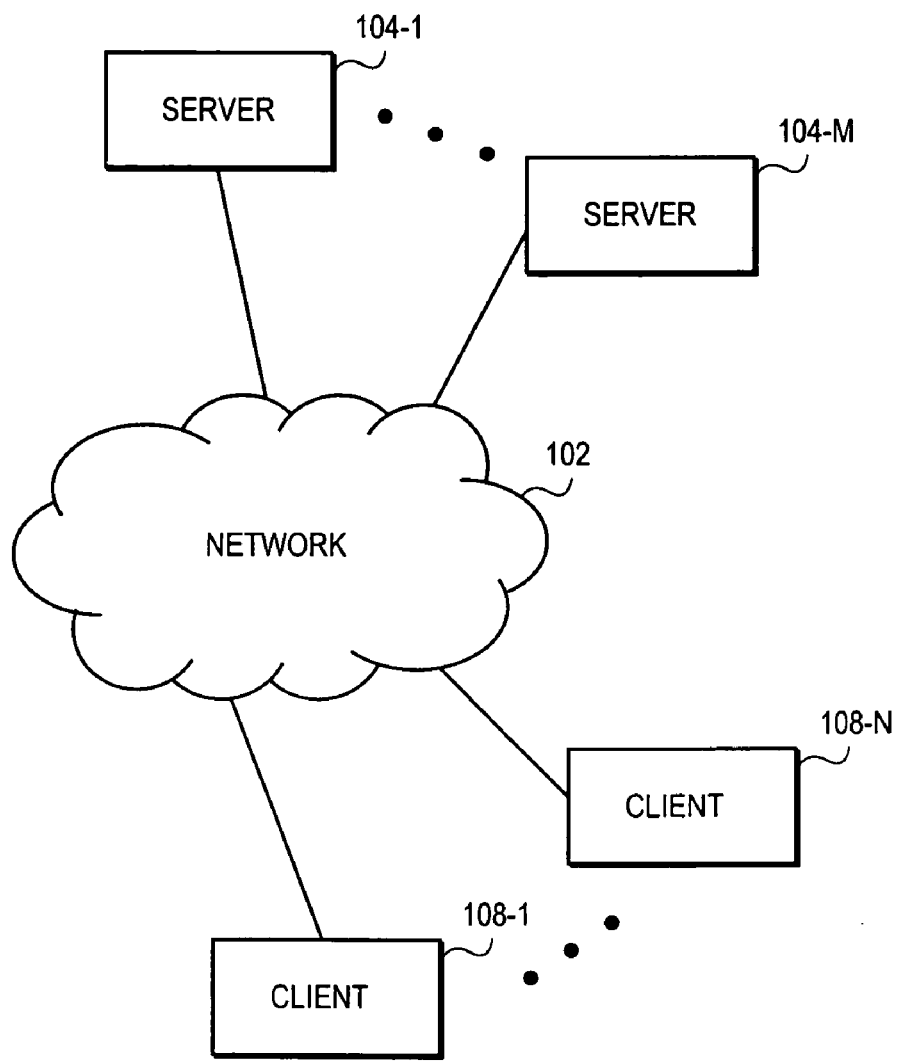
FIG. 1 illustrates a networked computer environment.

FIG. 1 illustrates a network environment in which the techniques described may be applied. As shown, several computer systems in the form of M servers 104-1 through 104-M and N clients 108-1 through 108-N are connected to each other via a network, which may be, for example, the Internet. Note that alternatively the network 102 might be or include one or more of: a Local Area Network (LAN), Wide Area Network (WAN), satellite link, fiber network, cable network, or a combination of these and/or others. The method and apparatus described herein may be applied to essentially any type of communicating means or device whether local or remote, such as a LAN, a WAN, a system bus, a disk drive, storage, etc.

Figure 2:
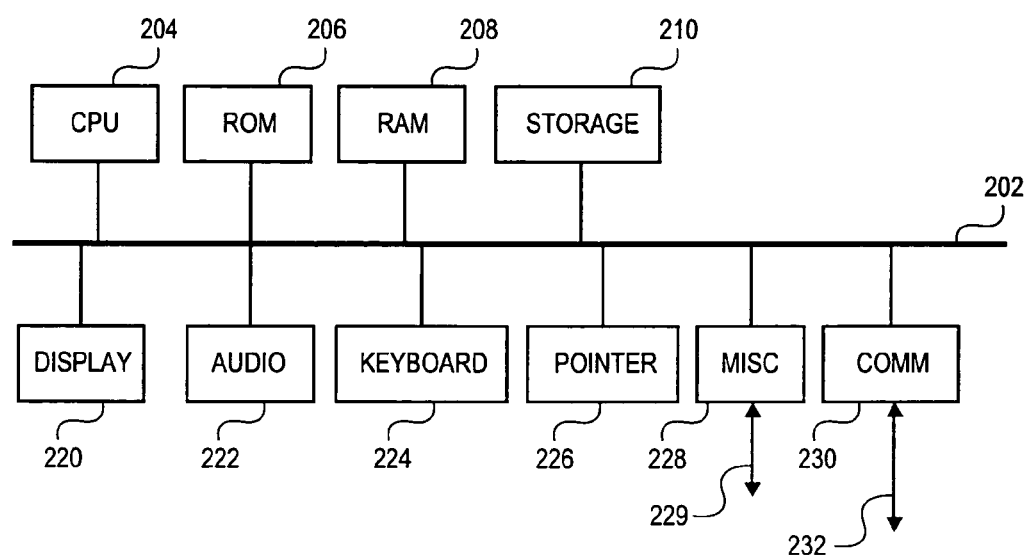
FIG. 2 is a block diagram of a computer system.

FIG. 2 illustrates a conventional personal computer in block diagram form, which may be representative of any of the clients and servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), etc. The CPU 204 may be a single, multiple, or even a distributed computing resource. The ROM 206 may be any type of non-volatile memory, which may be programmable such as, mask programmable, flash, etc. RAM 208 may be, for example, static, dynamic, synchronous, asynchronous, or any combination. Storage 210, may be Compact Disc (CD), Digital Versatile Disk (DVD), hard disks, optical disks, tape, flash, memory sticks, video recorders, etc. Display 220 might be, for example, a Cathode Ray Tube (CRT), Liquid Crystal Display (LCD), a projection system, Television (TV), etc. Audio 222 may be a monophonic, stereo, three dimensional sound card, etc. The keyboard 224 may be a keyboard, a musical keyboard, a keypad, a series of switches, etc. The pointer 226, may be, for example, a mouse, a touchpad, a trackball, joystick, etc. I/O devices 228, might be a voice command input device, a thumbprint input device, a smart card slot, a Personal Computer Card (PC Card) interface, virtual reality accessories, etc., which may optionally connect via an input/output port 229 to other devices or systems. An example of a miscellaneous I/O device 228 would be a Musical Instrument Digital Interface (MIDI) card with the I/O port 229 connecting to the musical instrument(s). Communications device 230 might be, for example, an Ethernet adapter for local area network (LAN) connections, a satellite connection, a settop box adapter, a Digital Subscriber Line (xDSL) adapter, a wireless modem, a conventional telephone modem, a direct telephone connection, a Hybrid-Fiber Coax (HFC) connection, cable modem, etc. The external connection port 232 may provide for any interconnection, as needed, between a remote device and the bus system 202 through the communications device 230. For example, the communications device 230 might be an Ethernet adapter, which is connected via the connection port 232 to, for example, an external DSL modem. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

Referring back to FIG. 1, clients 108-1 through 108-N are effectively connected to web sites, application service providers, search engines, and/or database resources represented by servers, such as servers 104-1 through 104-M, via the network 102. The web browser and/or other applications are generally running on the clients 108-1 through 108-N, while information generally resides on the servers 104-1 through 104-M. For ease of explanation, a single client 108-1 will be considered to illustrate one embodiment of the present techniques. It will be readily apparent that such techniques can be easily applied to multiple clients.

In FIG. 1, the client 108-1 may be running a boot sequence that has the capability to access the network. This capability would allow booting or any updates thereto from a server via the Internet and/or other network. A description of the method of updating or installation of any revised booting code and/or data is not necessary for an understanding of the present invention.

The information required for booting a device, such as a subsystem, in the present invention may, but is not limited to, embodiment in the CPU 204, the ROM 206, the Storage 210, etc. This boot information may consist of, but is not limited to, subsystem boot indicators, actual boot code and/or data for booting a subsystem, etc. Additionally, accesses through, for example, the Communications device 230 which might be, for example, an Ethernet adapter would allow access to a network wherein the information such as a subsystem boot indicator and/or the boot code information may be retrieved.

A subsystem may be, but is not limited to, one or more of the elements of FIG. 2. For example, Storage 210 may have a subsystem that handles how data is to be stored and retrieved. Audio 222 may have a subsystem that handles when to, for example, power down speakers. Communications device 230 may, for example, have a subsystem that needs to boot up independently of the main system upon receiving a message.

Figure 3:
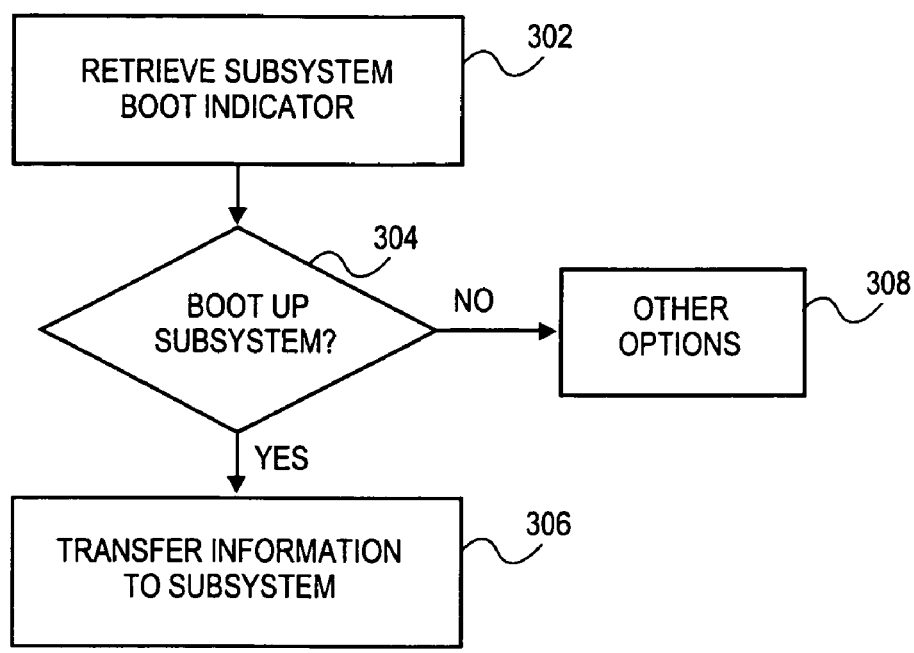
FIGS. 3, 4, and 5 are flow diagrams illustrating various embodiments of the invention.

FIG. 3 is a high level block diagram of one embodiment of the present invention. A subsystem boot indicator is retrieved 302. Based on the subsystem boot indicator retrieved 302, it is determined whether to boot up the subsystem 304. If the retrieved subsystem boot indicator 302 does not indicate a boot of the subsystem, then other options 308 may be available. If a boot of the subsystem is indicated then information is transferred to the subsystem 306.

The subsystem boot indicator may be, but is not limited to, a bit or bits in a memory location; information stored remote to the subsystem, for example, a main system or even more remote such as somewhere on an Internet web site; non-volatile storage, such as a hard disk, DVD, flash, etc.; or something as simple as a jumper across pins on a device. What is to be understood is that the subsystem boot indicator in whatever form and wherever located is an indication of the subsystem boot status and/or a requested boot operation. It is also to be understood that single as well as multiple resources may inquire into the status of the indicator or indicators. That is, for example, a power controller in a system may inquire as to the state of a subsystem boot indicator, as well as may a main system processor or even a remote client or server.

If the retrieved subsystem boot indicator 302 does not indicate a request to boot up the subsystem 304, then other options 308 may be available. For example, the subsystem boot indicator may contain information indicating that a previous boot attempt was unsuccessful and that some corrective action may be required.

Figure 4:
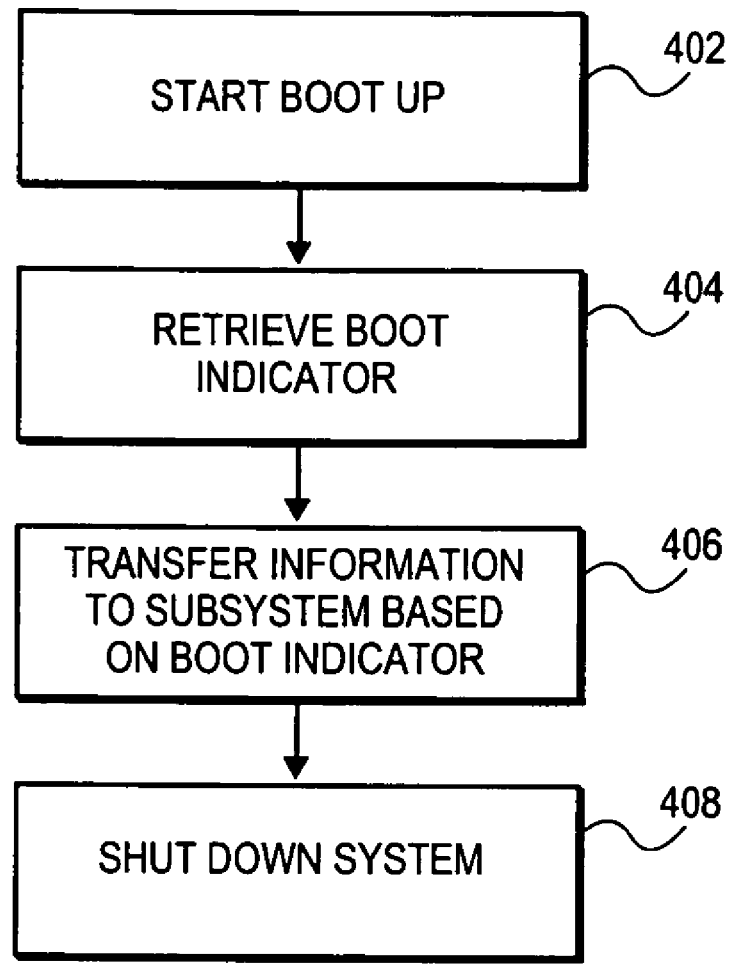

FIG. 4 is another embodiment of the present invention. A boot up process is started 402 during which a boot indicator is retrieved 404. Based upon the boot indicator retrieved 404 information is then transferred to the subsystem 406 after which the system is shut down 408.

Shut down 408, may but is not limited to, shutting down an entire system, a main system, subsystems, etc. For example, after information is transferred to the subsystem 406, the shutdown 408 may involve shutting down the main system and keeping a subsystem still active and alive. Thus, a subsystem may, for example, be processing information and operating while the sequence as illustrated in FIG. 4 is being performed.

An example of such an embodiment might be, but is not limited to, a main system processor, such as a Pentium® processor, starting to boot up, then retrieving a boot indicator from, for example, a flash memory location in a firmware hub, then based on this transferring information to a subsystem memory, and then shutting the main system down. The transferring of information in such a system by the main system processor may be needed because of the inability of a subsystem resource to directly access the information initially. That is, the main system processor may only be able to access the information until such time as it is transferred to the subsystem, after which a subsystem resource may have access. Alternatively, some other system resource, or even the subsystem itself may perform the transferring of information such that the subsystem has access to the information during its boot up.

Shutting down the system may save on power consumption. For example, the main system processor during a boot up may transfer information to a subsystem and then shut itself down. The subsystem, still powered up, may then use the information transferred by the main processor to boot up. In this way power consumption may be reduced.

It should be noted, that in the examples above, the main processor transfers the information without the need for the main processor to load an operating system, such as, Windows® or Linux®.

Figure 5:
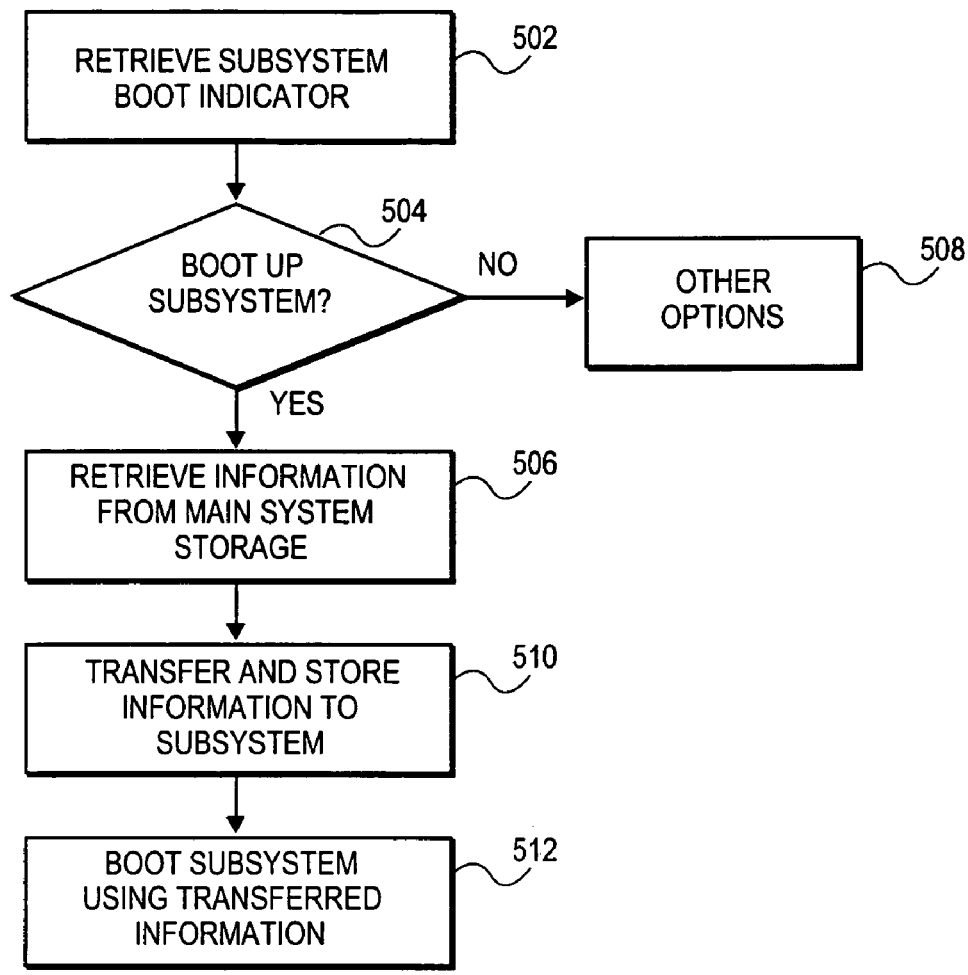

FIG. 5 is a more detailed flow diagram of an embodiment of the present invention. A subsystem boot indicator is retrieved 502. Based on the subsystem boot indicator retrieved 502, it is determined whether to boot up the subsystem 504. If the retrieved subsystem boot indicator 502 does not indicate a boot of the subsystem, then other options 508 may be available. If a boot of the subsystem is indicated then information is retrieved from a main storage system 506, and then transferred and stored to the subsystem 510. The subsystem then boots using this transferred information 512.

The main system storage may be, but is not limited to, hard disk storage, DVD, CD, ROM, flash, etc. Likewise, the storing of the transferred information may be, but is not limited to, another hard disk, a writeable device, RAM, flash, etc.

Figure 6:
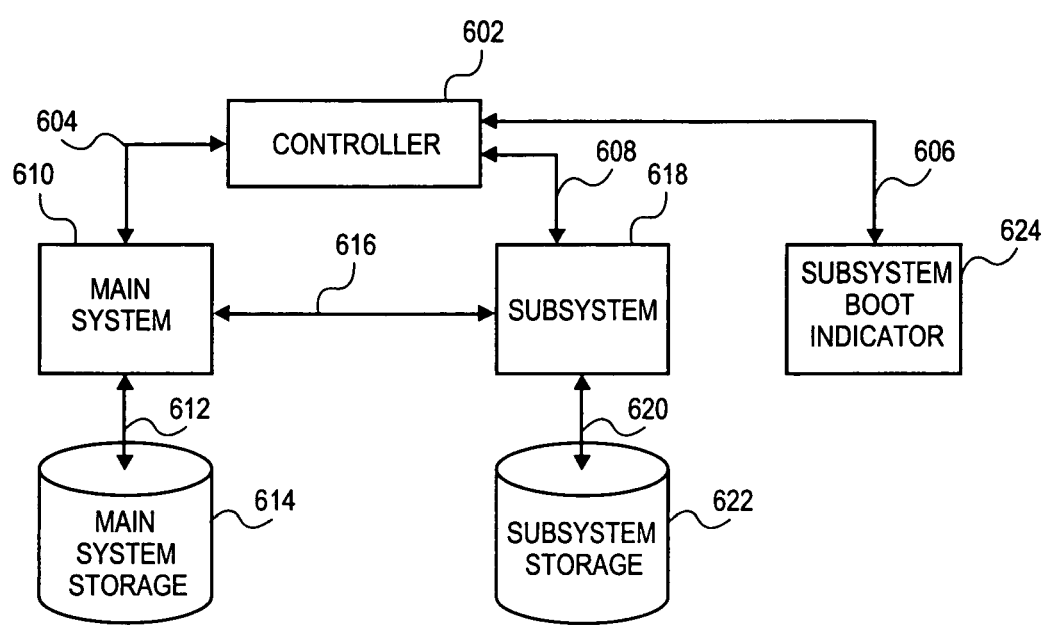
FIGS. 6, and 7 are block diagrams illustrating various embodiments of the present invention.

FIG. 6 illustrates one system architecture for embodiment of the present invention. Controller 602 is coupled to: Main system 610 via link 604; Subsystem 618 via link 608; and Subsystem boot indicator 624 via link 606. Main system 610 is additionally coupled to Main system storage 614 via link 612 and Subsystem 618 via link 616. Subsystem 618 is additionally coupled to Subsystem storage 622 via link 620.

An example of one possible mode of operation for the architecture as shown in FIG. 6 is as follows. Initially, Main system 610 and Main system storage 614 are powered down. Controller 602 receives a communication via link 608 from Subsystem 618 requesting that Subsystem 618 be booted. Controller 602 then examines the Subsystem boot indicator 624 via link 606 to determine the boot status. Assuming that a boot of the Subsystem 618 is to be performed, Controller 602 may then power up Main system 610 and Main system storage 614. Controller 602 may communicate via link 604 the subsystem boot indicator 624 status to the Main system 610 during its boot up process. Based on the subsystem boot indicator 624 the Main system 610 may then access the Main system storage 614 via link 612, retrieve information and transfer this information via link 616 to Subsystem 618 and via link 620 store it in the Subsystem storage 622. After the transfer of the information is complete, the Controller 602 may power down the Main system 610 and the Main system storage 614. The Subsystem 618 may then proceed to boot up using the information transferred and now stored in Subsystem storage 622.

After the Main system 610 determines that it is to transfer information to the Subsystem storage 622, it may be necessary for a processor in the Main system 610 to fetch instructions on how to perform this operation. These instructions may be communicated from a variety of sources, for example, the Main system storage 614, the Subsystem storage 622, the Controller 602, a remote server, etc.

Another example of a possible mode of operation for the architecture as shown in FIG. 6 would be to allow the Subsystem 618 to access via link 616 and link 612 directly to the Main system storage 614. In this scenario, the Subsystem 618 may effect the transfer of information from the Main system storage 614 to the Subsystem storage 622 rather than the Main system 610 effecting the transfer as discussed previously. One skilled in the art will recognize that many other architectures and variations are possible.

Figure 7:
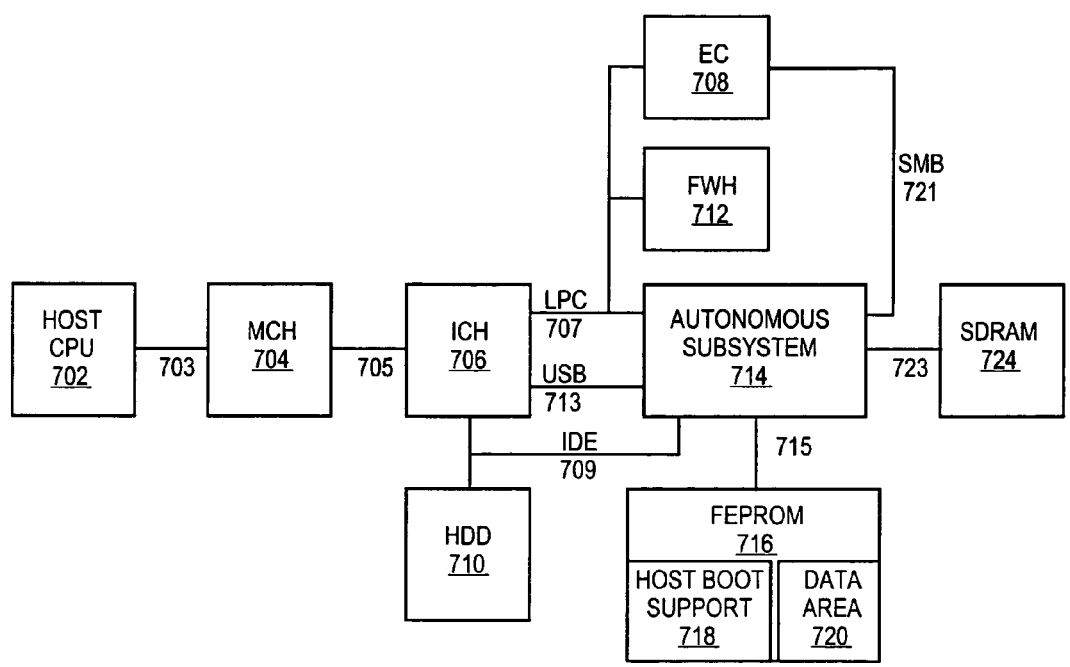

FIG. 7 illustrates another system architecture for embodiment of the present invention. A host central processing unit (CPU) 702 is coupled via link 703 to a memory controller hub (MCH) 704. The MCH 704 is coupled via link 705 to an input/output controller hub (ICH) 706. The ICH 706 is coupled to a hard disk drive (HDD) 710 via an integrated drive electronics (IDE) 709 link. The IDE 709 also couples the autonomous subsystem 714 to the HDD 710. The ICH 706 is also coupled to the autonomous subsystem 714 via a universal serial bus (USB) 713 link. Additionally the ICH 706 is coupled via a low pin count (LPC) 707 link to an embedded controller (EC) 708, a firmware hub (FWH) 712, and the autonomous subsystem 714. The autonomous subsystem 714 is coupled to the EC 708 via a system management bus (SMB) 721. The autonomous subsystem 714 is coupled to synchronous dynamic random access memory (SDRAM) via link 723. The autonomous subsystem 714 is coupled to a flash electrically programmable read only memory (FEPROM) 716 via link 715. It should be noted that the FEPROM 716 has some memory locations that are used for host boot support 718 and storage of data in a data area 720.

One possible embodiment of the invention in reference to FIG. 7 is as follows. The EC 708 enables power to the autonomous subsystem 714, which then examines the data area 720 within the FEPROM 716 to determine if a boot is required. If a boot is required, then the autonomous subsystem 714 informs the EC 708 over the SMB 721 that a boot is required. At this point, the EC 708 may use either the host CPU 702 to effect a transfer of information (denoted as slave mode) or the autonomous subsystem 714 to effect the transfer of information (denoted as master mode).

If the host CPU 702 is used to effect the transfer of information, i.e. slave mode, then the EC 708 may power up; the host CPU 702; the MCH 704; the ICH 706; the autonomous subsystem 714; the FEPROM 716 including the host boot support 718; the LPC 707; the USB 713; the IDE 709; and the links 703, 705, and 715. The host CPU 702 may then be vectored (i.e. directed) to the host boot support 718 to fetch instructions and/or data on how to effect the transfer of information. The source or destination of the information may be, but is not limited to, for example, the HDD 710, the FEPROM 716, the FWH 712, the SDRAM 724, a remote client or server, etc. Thus, the host CPU 702 may effect a transfer of information, for example, from the HDD 710 to the SDRAM 724. It is to be understood that any source and/or destination and their respective links would need to be powered up sufficiently to operate properly. After the transfer is complete, the EC 708 may power down the host CPU 702, the MCH 704, the ICH 706, the links 703 and 705, the LPC 707, the USB 713, and the IDE 709. The EC 708 may then communicate to the autonomous subsystem 714 via, for example, the SMB 721, to boot using the information transferred to the SDRAM 724.

In a similar fashion, if the autonomous subsystem 714 resources are used to effect the transfer of information, i.e. master mode, then the EC 708 may power up the HDD 710, the IDE 709, the autonomous subsystem 714; the FEPROM 716, the SDRAM 724, and the links 715 and 723. The autonomous subsystem 714 may then be instructed by the EC 708 via SMB 721 to fetch instructions and/or data from the FEPROM 716 on how to effect the transfer of information. The source or destination of the information may be, but is not limited to, for example, the HDD 710, the FEPROM 716, the FWH 712, the SDRAM 724, a remote client or server, etc. Thus, the autonomous subsystem 714 resources may effect a transfer of information, for example, from the HDD 710 to the SDRAM 724. After the transfer is complete, the EC 708 may power down the HDD 710, the IDE 709, and may then communicate to the autonomous subsystem 714 via, for example, the SMB 721, to boot using the information transferred to the SDRAM 724.

The illustrated embodiments of the present invention are to be understood as applicable to a plurality of subsystems within a single and/or distributed system or systems. For example, in a single system, there may be a subsystem handling user input, from for example, a keyboard, while at the same time another subsystem is handling, for example, the transmission and reception of data via a wireless link. In the quest to conserve power these various subsystems may be powering on and booting up and then powering down asynchronously. For example, a keyboard subsystem may power up only when a key is being activated and may power down between keystrokes. Similarly, a communications subsystem may only power up when transmission or reception is necessary.

Thus, a method and apparatus for booting the operating environment of a subsystem without involvement of the main operating system have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method comprising:
   retrieving a subsystem boot indicator;
   transferring boot information to an autonomous subsystem included in a computer system based on the subsystem boot indicator, wherein the transferring of the boot information to the autonomous subsystem is performed independent of a main operating system (O/S) and a main system which are included in the computer system, wherein the main O/S and the main system are coupled with the autonomous subsystem; and
   booting the autonomous subsystem independent of the main system.

2. The method of claim 1, wherein the subsystem boot indicator is located in a non-volatile storage device.

3. The method of claim 2, wherein the non-volatile storage device is located within the autonomous subsystem.

4. The method of claim 1, wherein the transferring of the boot information to the autonomous subsystem is performed over a bus with a width less than that of the main system.

5. The method of claim 1, wherein the transferring of the boot information to the autonomous subsystem is performed over a communication link whose bandwidth is less than that of the main system.

6. The method of claim 1, wherein transferring information to the subsystem is transferring information to a memory accessible by the autonomous subsystem.

7. A method comprising:
   starting a boot up of a main system, the main system coupled with an autonomous subsystem and a main operating system (O/S), wherein the main system, the autonomous subsystem, and the main O/S are included in a computer system;
   retrieving a boot indicator;
   transferring boot information from an inaccessible location by the autonomous subsystem to an accessible location by the autonomous subsystem based upon the boot indicator; and
   shutting down the main system before the main O/S has started executing; and
   booting the autonomous subsystem independent of the main system.

8. The method of claim 7, wherein the shutting down of the main system does not shut down the autonomous subsystem.

9. The method of claim 7, wherein the inaccessible and accessible location are is a memory locations.

10. A machine-readable medium having stored thereon data representing sets of instructions which, when executed by a machine, cause the machine to:
    retrieve a subsystem boot indicator;
    transfer boot information to an autonomous subsystem included in a computer system based on the subsystem boot indicator, wherein the transferring of the boot information to the autonomous subsystem is performed independent of a main operating system (O/S) and a main system which are included in the computer system, wherein the main O/S and the main system are coupled with the autonomous subsystem; and
    boot the autonomous subsystem independent of the main system.

11. The machine-readable medium of claim 10, wherein the transferring of the boot information to the autonomous subsystem comprises transferring the boot information to a storage device accessible by the autonomous subsystem.

12. The machine-readable medium of claim 11, wherein the subsystem boot indicator is received from a non-volatile storage device.

13. A computer based system comprising:
    a memory device;
    a main system coupled with a main storage device and the memory device, the main system including a main operating system (O/S);
    an autonomous subsystem coupled with a first storage device and a second storage device;
    a subsystem boot indicator; and
    a boot up controller to access the subsystem boot indicator and initiate a booting of the autonomous subsystem independent of the main system and based upon the subsystem boot indicator, wherein the booting of the autonomous subsystem includes retrieving boot information from the first storage device and transferring the retrieved boot information to the second storage device, wherein the retrieving and transferring are to be performed independent of the main O/S.

14. The computer based system of claim 13 wherein the subsystem boot indicator is located in the main storage device.

15. The computer based system of claim 13 wherein the boot up controller examines the subsystem boot indicator to determine a boot status.

16. An apparatus comprising:
    a main system coupled with a main storage device, the main system including a main operating system (O/S);
    a subsystem coupled with a subsystem storage device;
    a subsystem boot indicator; and
    a boot up controller to access the subsystem boot indicator and initiate a booting of the subsystem based upon the subsystem boot indicator, wherein the booting of the subsystem includes retrieving information form a first storage device and transferring the retrieved information to a second storage device, wherein the retrieving and transferring are to be performed by a main system resource without the use of the main O/S.

17. The apparatus of claim 16 wherein the subsystem boot indicator is located in the first storage device.

18. The apparatus of claim 16 wherein the boot up controller examines the subsystem boot indicator to determine a boot status.

* * * * *

UNITED STATES PATENT AND TRADEMARK OFFICE
CERTIFICATE OF CORRECTION

| | | |
|---|---|---|
| PATENT NO. | : 7,149,888 B1 | Page 1 of 1 |
| APPLICATION NO. | : 09/675977 | |
| DATED | : December 12, 2006 | |
| INVENTOR(S) | : Hart et al. | |

It is certified that error appears in the above-identified patent and that said Letters Patent is hereby corrected as shown below:

In column 7, at line 41, after "O/S" insert --,--.
In column 8, at line 13, delete "is a".
In column 8, at line 66, delete "form" and insert --from--.

Signed and Sealed this

Sixth Day of November, 2007

JON W. DUDAS
*Director of the United States Patent and Trademark Office*